Oct. 3, 1967  R. G. PARKISON  3,344,800
CLOSET TANK FITTING
Filed July 8, 1964  2 Sheets-Sheet 1
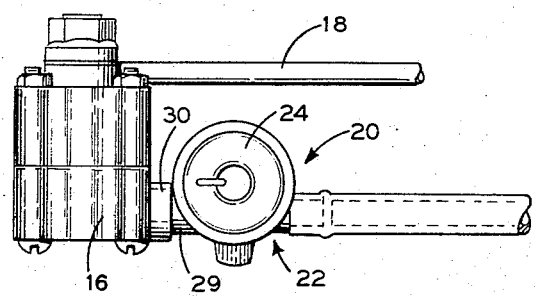
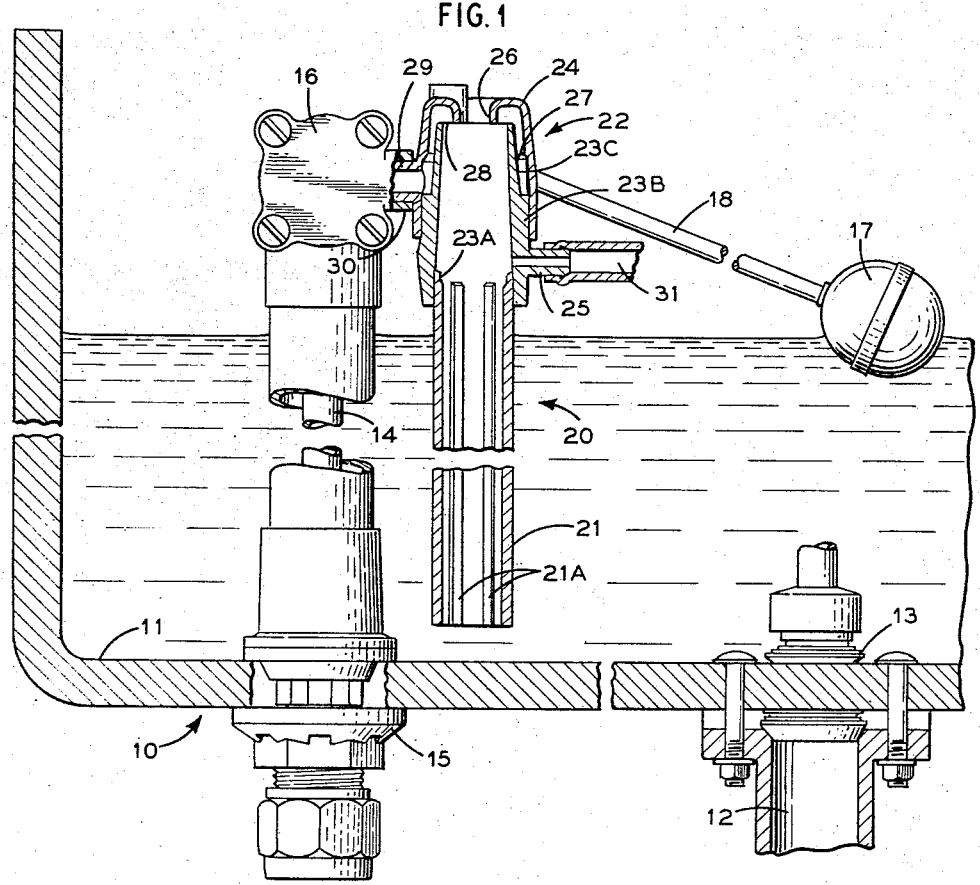
INVENTOR.
Richard G. Parkison
BY Frank G. Jordan
ATTORNEY Oct. 3, 1967  R. G. PARKISON  3,344,800
CLOSET TANK FITTING Filed July 8, 1964  2 Sheets-Sheet 2

INVENTOR.
Richard G. Parkison
BY *Frank J. Jordan*
ATTORNEY

United States Patent Office 3,344,800
Patented Oct. 3, 1967

3,344,800
CLOSET TANK FITTING
Richard G. Parkison, Louisville, Ky., assignor to American Radiator & Standard Sanitary Corporation, New York, N.Y., a corporation of Delaware
Filed July 8, 1964, Ser. No. 381,075
6 Claims. (Cl. 137—216)

This invention relates in general to a fitting for use in the tank of a water closet, and more specifically, to an improved tank refill and backflow preventer fitting for water closet tanks.

Generally, the tank of a water closet defines a reservoir for the supply of water that can be discharged into the trap of a water closet bowl to create the siphonic action necessary to flush the bowl. Upon emptying, the tank is automatically filled. The fittings by which the tank is automatically filled comprise essentially of a water inlet having a valve means under the operation of a float control to regulate the flow of water into the tank, a connected tank refill hush tube, a backflow preventer to prohibit the occurrence of a reverse siphonic effect, a trap refill tube to supply makeup to the trap, an overflow preventer which functions as a safety to limit the maximum water level in the tank, and an outlet valve to control the flow or discharge of water from the tank to the trap.

Heretofore, as disclosed, for example, in my U.S. Patent 3,107,747 issued October 22, 1963, the tank refill hush tube and associated backflow preventer, with which this invention particularly relates, comprised essentially of a tank refill hush tube with an associated backflow preventer defining a swirl chamber which connected in communication therewith through an annular opening. The water inlet to the swirl chamber was tangentially disposed relative thereto to impart a whirling motion to the water entering thereinto. The swirl chamber in turn was formed with a downspout which opened the hush tube and swirl chamber to the atmosphere to prevent a reverse siphonic effect. In operation, the swirling of the water within the swirl chamber, upon filling, would spill over through the annular opening into the tank filling hush tube wherein the water continued to swirl as it dropped toward the level of the tank water within the tube.

Since as an incident to the refilling of the tank the water closet bowl trap is also required to be filled, the water for the trap was supplied by withdrawing a portion of the swirling water directly from the swirl chamber. This was attained by connecting a trap refill tube to an outlet connected directly to the swirl chamber. While this construction operated satisfactorily, it necessitated a backflow preventer structure that was relatively large, such backflow preventer requiring a substantially large air inlet in order to supply enough air to the swirl chamber thereof to keep the pressure in the chamber to about one inch of water of atmospheric pressure so as to not cause water to flow up the tank refill tube and into the swirl chamber and connected valve.

Accordingly, an object of this invention is to provide an improved backflow preventer constructed and arranged in a manner which will permit the size and complexity thereof to be susbtantially reduced without adversely effecting the operation of the water closet refill fitting.

Another object is to provide an improved backflow preventer constructed and arranged so as to minimize the critical limitation of the negative pressure within the swirl chamber thereof, and thus allow for an appreciable reduction in the area of its opening to the atmosphere, and as a result thereof, a reduction in the overall size and cost thereof.

Still another object is to provide a backflow preventer in which the shut off of the trap refill tube occurs earlier than that in the prior known structures.

Still another object is to provide a tank refill fitting in which the noise and vibration is reduced to a minimum when in operation.

Still another object is to provide an improved tank refill fitting and combined backflow preventer that is relatively simple in construction, can be easily manufactured and which is positive in operation.

The foregoing objects, features and other advantages of this invention are attained by a tank refill fitting adapted for use in the tank of a water closet comprising a tank refill hush tube and a backflow preventer defining a swirl chamber connected to the upper end of the tube so that the tube is open to both the swirl chamber and the atmosphere. The arrangement is such that the swirl chamber is provided with a tangentially disposed inlet to impart a swirling movement to the fluid entering thereinto.

In accordance with this invention, an outlet for supplying water to the trap refill is disposed downstream of the swirl chamber. This may be attained by constructing the backflow preventer of two complementary sections comprising a tubular body portion adapted to be fitted to the upward end of the refill tube and a complementary cap portion constructed so as to define with the body portion a swirl chamber which spills over into the body portion. Accordingly, the cap portion is provided with a tangential inlet connecting to the swirl chamber defined by spaced wall portions by the respective cap and body portions; and the body portion is provided with a trap outlet disposed downstream of the swirl chamber for supplying the water necessary for the trap refill.

A feature of this invention resides in the provision of an improved backflow preventer construction in which the outlet for supplying the water for the trap refill is disposed downstream of the swirl chamber.

Another feature of this invention resides in the provision of an improved backflow preventer constructed to define a swirl chamber in which the inlet thereto is disposed upstream thereof and in which the trap refill outlet is disposed downstream thereof.

Another feature of the invention resides in the provision of a backflow preventer in which a quicker shut off of the trap refill is attained.

Other features and advantages will become more readily apparent when considered in view of the drawings and specification in which, FIGURE 1, is a vertical sectional view taken through the tank refill and associated backflow preventer fitting of the instant invention.

FIGURE 2 is a partial plan view of FIG. 1.

Figure 5:
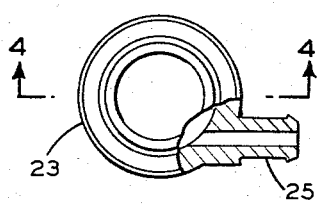
FIGURE 5 is a detail plan view of the body portion of FIG. 3 having portions thereof shown in section.

Referring to the drawings, there is shown in FIG. 1 a fragmentary portion of a water closet tank 10. Such tanks 10 are normally made of ceramic and comprise a hollow reservoir bottom portion 11 which is open at the top, and a lid (not shown) to form a closure therefor. The lid is rendered readily removable so that access may be had to the fittings disposed within the tank. Normally, a discharge pipe 12 is placed in communication with an opening formed in the bottom of the tank 11 and it communicates with the trap of a water closet bowl (not shown).

Under normal conditions, the tank 11 is filled with water to a predetermined established depth to provide a supply from which water is drawn to discharge into the trap upon the opening of the discharge valve 13 to begin the siphonic action necessary to empty the water closet trap.

Essentially, the tank fittings comprise a water inlet pipe 14 connected to a suitable water supply. Accordingly, the water intake pipe or line 14 enters through a wall portion of the tank through a water tight fitting 15 so as to prevent leaking therearound. The water inlet line 14 extends upwardly to a height at which its upper end thereof is disposed above the maximum normal water level contained within the tank. An inlet valve means 16 is provided in the upper end of the water inlet line 14 to control the issuance of water from the line into the tank. The inlet valve 16 in turn may be actuated by the movement of a ball float 17 which is connected to the end of a rod extension 18 which is suitably connected to the inlet valve 16 in a manner known to those skilled in the art. The arrangement is such that the valve 16 will open as the ball float 17 moves downwardly and the valve 16 will close as the ball float moves in the opposite direction; that is, upwardly with respect to the inlet valve. Thus, when the ball float 17 is in a position, as indicated in FIG. 1, the inlet valve 16 is completely closed.

Connected to the outlet of the control valve is a combined backflow preventer and tank refill tube 20 to silence the flow of water into the tank and to prevent the occurrence of any reverse siphonic effect. In accordance with this invention, the tank refill or hush tube 21 is vertically disposed and has connected to the upper end thereof the backflow preventer 22 of the instant invention. Normally, the upper end of the hush tube 21 extends above the maximum water level of the tank. A plurality of longitudinally extending ribs 21A are circumferentially spaced about the interior wall of the tube 21. Accordingly, the ribs 21A function to reduce the swirling speed of the water within the tube 21 and thus tend to eliminate objectionable noises at near shut-off which is caused by the rapid rise of the vortex as the tangential velocity is quickly lost.

Figure 4:
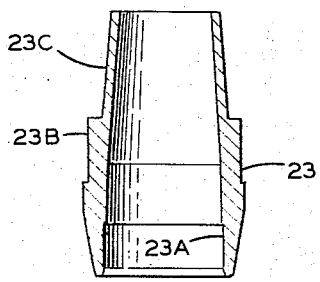
FIGURE 4 is a vertical sectional view of the body portion taken along line 4—4 of FIG. 5.
Figure 3:
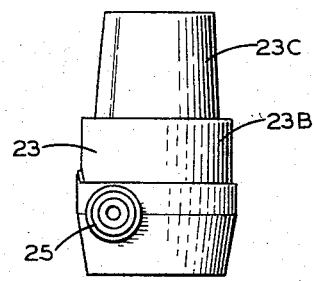
FIGURE 3 is a detail view of the body portion of the backflow preventer of the instant invention.

In accordance with this invention, the backflow preventer 22 associated with the hush tube 21 may comprise complementary component elements which include a backflow preventer body 23 and a backflow preventer cap 24. As best seen in FIGS. 3 to 5, the backflow preventer body 23 comprises essentially a tubular member formed of any suitable non-corrosive material, such as plastic, having a cylindrical seat portion 23A by which it is adapted to be fitted to the upper end of the hush tube 21. The tubular body 23 is also provided with a cylindrical portion 23B and an inwardly stepped upper portion 23C. Extending laterally to one side of the tubular body 23 adjacent the bottom thereof is a nipple 25 which is constructed and arranged to define a tangential outlet.

Figure 7:
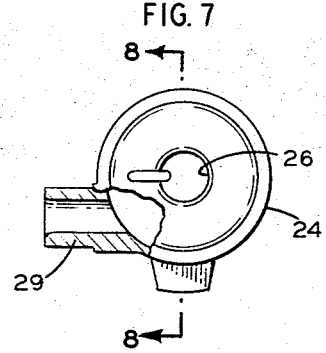
FIGURE 7 is a detail plan view of FIG. 6 having portions thereof shown in section and, FIGURE 8 is a vertical sectional view taken along line 8—8 on FIG. 7.
Figure 6:
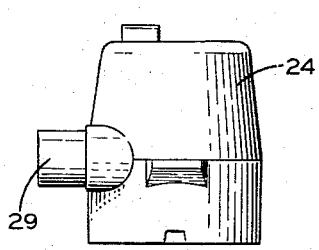
FIGURE 6 is a detail elevation view of the cap portion of the backflow preventer of the instant invention.
Figure 8:
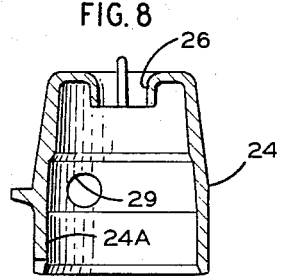

Cooperatively associated with the backflow preventer body 23 is a backflow preventer cap 24. As best seen in FIGS. 6 to 8, the cap 24 comprises a substantially cylindrical wall member having an inwardly turned annular portion terminating in a downspout 26. The cap is provided with a cylindrical seat 24A which is sized to snugly receive the lower portion 23B of the tubular body 23. The arrangement is such that when the cap 24 is fitted to the body 23, a swirl chamber 27 is defined between the inner circumferential wall portion of the cap 24 and the upper wall portion 23C of the preventer body 23. With the cap 24 fitted to the tubular body 23, the downspout 26 of the cap defines with the upper end of the tubular body 23 an annular opening 28 which connects the swirl chamber 27 with the interior of the tubular body 23. Also the downspout 26 opens the hush tube 21 and the swirl chamber 27 to the atmosphere.

In accordance with this invention, the inlet 29 to the swirl chamber 27 is defined by a tangentially disposed nipple which is adapted to connect with the outlet 30 of the valve means 16. Accordingly, the water entering swirl chamber 27 through the tangential inlet 29 will have imparted thereto a swirling motion.

In operation, the falling of the water level within the tank 11 causes the ball float 17 to move downwardly, thus opening the valve 16 and permitting water from the supply to enter the inlet 29. Since the inlet 29 is tangentially disposed relative to the swirl chamber 27, a swirling motion will be imparted to the water in the swirl chamber. As the swirl chamber 27 fills, the swirling water therein will spill over the annular opening 28 and into the tubular body 23. The water will still be swirling as it passes into the tubular body 23 and accordingly, when such swirling water descends to the level of the tangential outlet 25, a part of it will flow into the latter while the major portion will pass down through to the refill tube 21. It will be seen, therefore, that the energy imparted to the water in the swirl chamber 27 is used to cause some of the water to flow out through the tangential outlet 25 and thereby fill the water closet bowl trap (not shown). The major portion of the water will pass through the refill tube 21 to fill the tank 11. The ribs 21A in the hush tube 21 reduce the swirling speed of the water therein thereby eliminating objectionable noise, at near shut-off, caused by the rapid rise of the vortex as the tangential velocity is lost rather quickly.

It will be noted that the annular area in the swirl chamber 27 above the inlet 29 is decreased. This more evenly distributes the swirl as it leaves the swirl chamber thereby providing quieter operation with less vibration.

As previously mentioned the purpose of the backflow preventer is to prevent water from being drawn up from the tank into the valve 16 and into the potatable water system in the event of a negative pressure in the inlet line to the valve 16. Thus under backflow conditions, the creation of a negative pressure on the inlet of the valve 16 will cause air to be drawn from the swirl chamber 27 and the downspout 26. However since the downspout is open to atmosphere, water cannot be drawn up from the hush tube 21 or through the trap refill 25. The pressure in the hush tube 21 and the outlet 25 is only slightly reduced so that the amount that the water rises in the hush tube 21 establishes the critical level.

Thus it will be seen that when a vacuum is applied to the inlet valve 16 and the refill tube 21 is submerged in the water within the tank, that the air inlet to the swirl chamber 27 must be of such magnitude so as to supply enough air to the swirl chamber to keep the pressure within the swirl chamber within about one inch of water of atmospheric pressure so as not to cause water to flow up the refill tube 21 and into the swirl chamber and on into the valve. By locating the trap refill outlet 25 downstream of the swirl chamber, the negative pressure in the swirl chamber does not have such a critical limitation and therefore allows appreciable reduction in the area of the opening to the atmosphere, thereby reducing the size of the device.

As previously mentioned, the outlet 25 for the bowl trap refill is located downstream, fluid flow wise, from the swirl chamber 27 thus making backflow from the refill tube impossible. Also the illustrated construction further simplifies the structure of the backflow preventer while at the same time permitting the same to assume smaller dimensions without adversely affecting the operation thereof.

It will be understood that the swirl chamber may be constructed in a different manner from that illustrated (e.g. a single piece may be used in place of the cap and body) and that the construction illustrated is merely one example.

While the instant invention has been described and illustrated with reference to a particular embodiment thereof, it will be understood that variations and modifications thereof may be made without departing from the spirit and scope of the invention.

What is claimed is:
1. A water closet tank refill fitting comprising:
   (a) a tank refill tube, said refill tube having an open lower end, and an outlet means between said upper and lower ends and disposed tangentially to said tube; and
   (b) a backflow preventer, said backflow preventer being disposed at the upper end of said refill tube and having an annular member circumscribing said upper end of said tube and forming a hollow swirl chamber having a closed lower end and an open upper end, fluid inlet means proximate said closed lower end and disposed tangentially relative to said hollow chamber, and an inwardly and downwardly extending downspout extending from the upper end of said annular member to a position proximate the upper end of said refill tube, the outside diameter of said downspout being less than the inside diameter of said refill tube.
2. The structure of claim 1, wherein said outlet in said refill tube is located in the region in which fluid within the tube is undergoing substantial swirling.
3. The structure of claim 2, wherein said refill tube has a gradually decreasing cross-section in the region from said outlet to the upper edge of said refill tube.
4. The structure of claim 2, wherein said refill tube has a plurality of axially extending ribs downstream of said outlet for reducing the swirling speed of the fluid.
5. A refill fitting as set forth in claim 1 wherein an upper section of said annular hollow portion is narrower than a lower section thereof thereby more evenly distributing the swirling water as the latter exits the swirl chamber.
6. A refill fitting as set forth in claim 1 further comprising ribs downstream of said outlet means for reducing the swirling speed of the fluid.

References Cited
UNITED STATES PATENTS

| | | | |
|---|---|---|---|
| 2,087,503 | 7/1937 | Clemmons | 137—216 |
| 2,143,477 | 1/1939 | Dillion et al. | 138—39 |
| 2,686,035 | 8/1954 | Wuesthoff | 137—216 X |
| 3,107,747 | 10/1963 | Parkison | 4—18 X |

WILLIAM F. O'DEA, *Primary Examiner.*

D. H. LAMBERT, *Assistant Examiner.*